Figure 1:
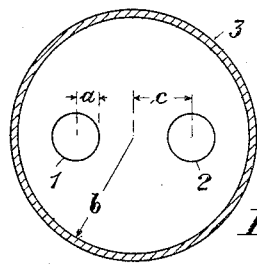

March 17, 1936.  H. E. CURTIS ET AL  2,034,026

CIRCUITS WITH CIRCULAR SHIELDS

Filed June 7, 1933  2 Sheets-Sheet 1

INVENTORS
H. E. Curtis and S. P. Mead
BY
ATTORNEY

March 17, 1936.  H. E. CURTIS ET AL  2,034,026
CIRCUITS WITH CIRCULAR SHIELDS
Filed June 7, 1933   2 Sheets-Sheet 2

INVENTORS
H. E. Curtis and S. P. Mead
BY
ATTORNEY

Patented Mar. 17, 1936

2,034,026

UNITED STATES PATENT OFFICE 2,034,026

CIRCUITS WITH CIRCULAR SHIELDS

Harold E. Curtis, East Orange, N. J., and Sallie P. Mead, New York, N. Y., assignors to American Telephone and Telegraph Company, a corporation of New York Application June 7, 1933, Serial No. 674,767

15 Claims. (Cl. 178—44)

This invention is concerned with electrical transmission circuits and especially with circuits derived from a pair of conductors surrounded by an individual conducting shield. A particular object of the invention is to obtain transmission circuits which have the properties of low attenuation and substantial freedom from interference over a wide band of frequencies.

In determining the type of transmission circuits to be used for the transmission of high frequencies or broad bands of frequencies, there are two important characteristics to be considered; (1) Susceptibility of the circuit to external disturbances such as crosstalk from nearby circuits and interference or noise from other outside sources, and (2) the high frequency attenuation, which should be kept as low as is consistent with securing a desirable size and favorable mechanical properties.

In accordance with the present invention it is proposed to enclose a pair of conductors in a conducting shield and to utilize the three conductors in such a manner as to obtain two independent electrical transmission circuits. It is proposed to derive one of the circuits from the two enclosed conductors, one as a return for the other. The other circuit is derived from the two enclosed conductors in parallel as one conductor with the shield as a return. The shield acts to prevent external electromagnetic and electrostatic high frequency disturbances from causing disturbances in either of the circuits.

In order to reduce the high frequency attenuations of the shielded circuits, it is proposed to secure low shunt losses by employing a dielectric having a small power factor and to reduce the series losses in the conductors by employing a medium having a low dielectric constant. Accordingly, it is proposed in one embodiment of the invention to utilize a substantially gaseous dielectric between the conductors of the pair and between these conductors and the conducting shield. The invention comprehends also, however, the use of non-gaseous dielectric material to insulate the conductors from one another and from the shield. A particular object of the invention is the provision of a configuration of conductors and conducting shield which for any given size of shield and for any given attenuations per unit length of these circuits will maximize the total frequency range provided by the two circuits.

More broadly, the invention is concerned with systems in which balanced pairs with individual circular conducting shields are used to provide two independent transmission circuits for the transmission of high frequencies or wide bands of frequencies.

The satisfactory transmission of television images with good definition requires the transmission of a frequency band which may extend from zero frequency to hundreds or perhaps thousands of kilocycles. If, for example, it is desired to transmit, with a total of 24 reproductions per second, an image containing 40,000 picture elements, there is required a frequency band of approximately 500 kilocycles in width. Still wider frequency bands may be necessary for representing with adequate detail such scenes as a theatrical performance or an athletic event. A pair of television bands of such width might be transmitted directly over the two transmission circuits provided by a shielded pair designed in accordance with the principles of the invention, or the bands might be shifted to a higher frequency position in order to avoid the necessity of transmitting the extremely low television frequencies over the line.

Moreover, by the application of multiplexing, the wide frequency bands obtained from a shielded pair which is designed in accordance with the invention may be used to provide substantial numbers of narrower frequency bands suitable for other communication purposes, as, for example, for telephone circuits which may require bands of about 2500 cycles in width, for high quality program circuits which may require bands extending up to 10,000 cycles or higher, for high speed facsimile transmission, or for other services.

Also the unbalanced-to-ground and the balanced-to-ground shielded circuits of the type described herein are especially adapted for connecting antennas with radio transmitting or receiving apparatus, inasmuch as these circuits may be designed to have low attenuation and substantial immunity from interference at frequencies employed for radio transmission.

Figure 2:
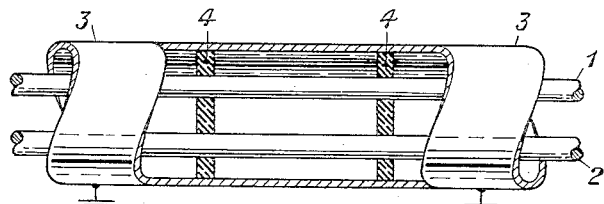
Figure 6:
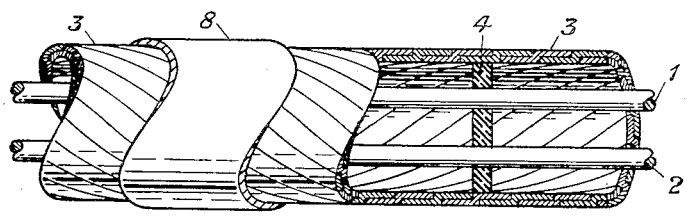
Figure 7:
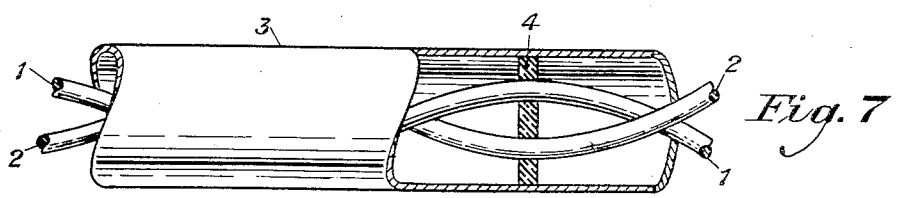
Figure 8:
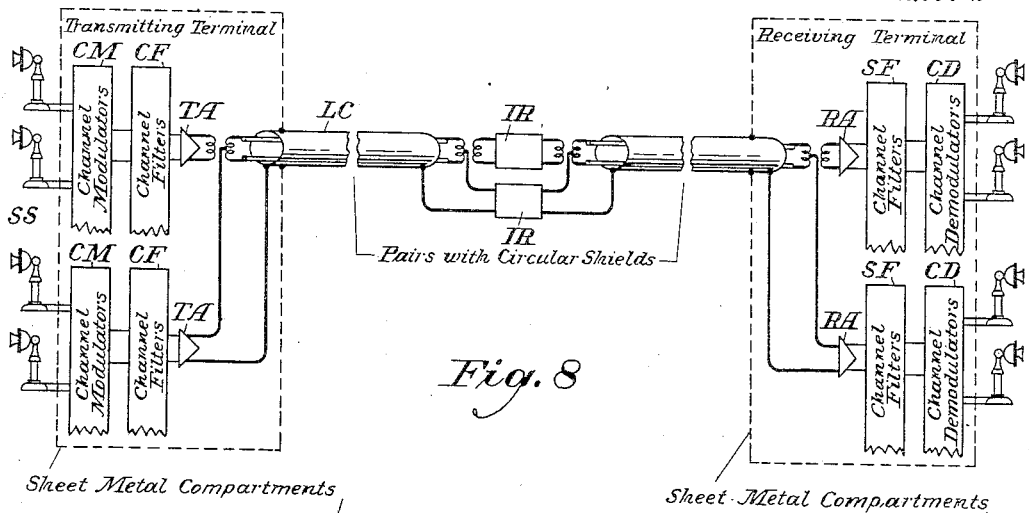
Figure 9:
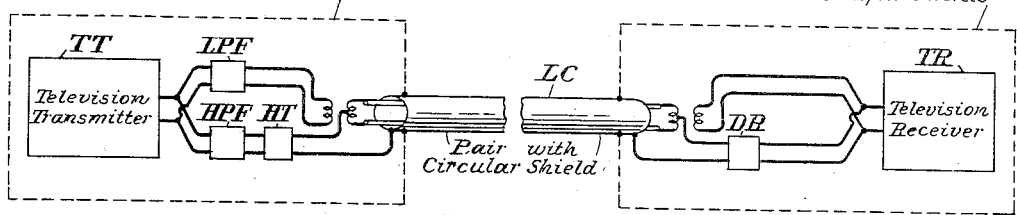
Figure 10:
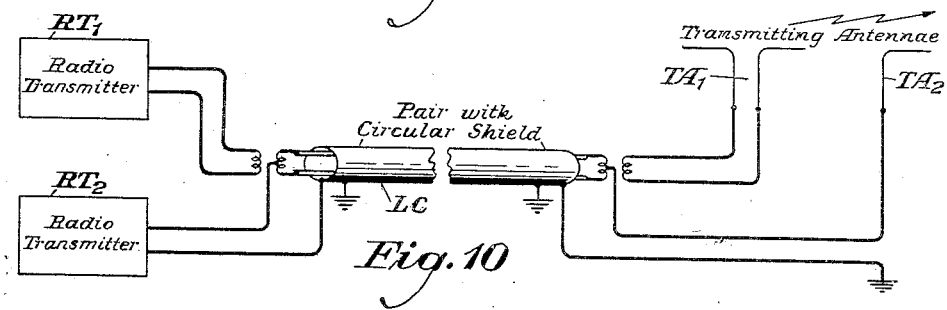
Figure 11:
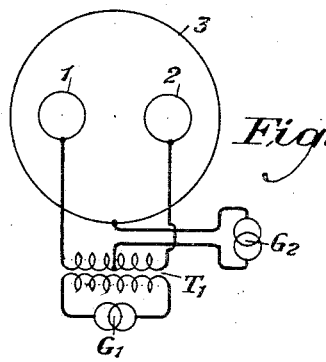
Figure 12:
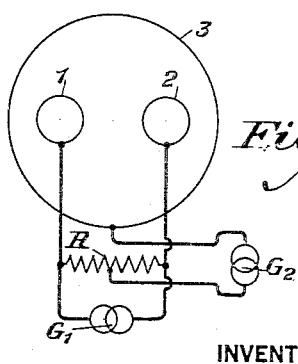

These and other objects and features of the invention will now be more readily understood from the following description when read in connection with the accompanying drawings. Figure 1 is a cross-sectional diagram of a pair of conductors surrounded by a circular conducting shield. Fig. 2 represents a view of a transmission structure designed in accordance with the invention. This structure consists of a pair of wires with a circular conducting shield. Figs. 3 to 7 show various other structures embodying the principles of the invention. Figs. 8 to 10 typify arrangements of apparatus which may be used in association with the circuit derived from the pair of wires with a circular conducting shield. Figs. 11 and 12 show two methods by which the independent transmission circuits can be obtained from a pair of conductors surrounded by a circular conducting shield.

A form of construction which has been suggested as being suitable for a shielded and balanced transmission circuit is indicated by the cross-sectional diagram in Fig. 1. This structure comprises two conductors 1 and 2 which are surrounded by a circular shield 3. Such a construction is the subject of the copending application of E. I. Green and H. E. Curtis, Serial No. 674,763 filed June 7, 1933, and that of E. I. Green, H. E. Curtis, and S. P. Mead, Serial No. 674,762, filed June 7, 1933. In these applications methods have been described for proportioning and spacing the conductors in order to obtain minimum attenuation for the circuit consisting of the enclosed conductors, one as a return for the other.

If the conducting shield 3 of Fig. 1 is utilized as a conductor with the enclosed conductors 1 and 2 in parallel as a return, a second independent circuit can be obtained. In this manner the usefulness of a transmission system of this nature can be considerably increased. Accordingly, it is a specific purpose of the present application to determine the relative dimensions and spacing of such a transmission structure which result in its greatest usefulness. Accordingly, the diameter and spacing ratio of a structure consisting of two conductors surrounded by a cylindrical conducting shield will be determined such that the total frequency range provided by the two circuits will be a maximum for a given sized shield and any given maximum allowable attenuations for the two circuits. Relative dimensions and spacings of the conductors and conducting shield can be determined for the above conditions by considering the expressions for the attenuations of the circuits. The high frequency attenuation for the circuit comprising one of the enclosed conductors as a return for the other can be given by the expression:

$$\alpha_1 = K_1\sqrt{f_1} \tag{1}$$

where $\alpha_1$ is the attenuation per unit length, $f_1$ is the frequency and $K_1$ a constant. Similarly the high frequency attenuation for the circuit comprising the circular shield as one conductor with the two enclosed conductors in parallel as the return is given by the expression $$\alpha_2 = K_2\sqrt{f_2} \tag{2}$$

Hence, the sum of the frequency ranges that can be transmitted over the two circuits with attenuations $\alpha_1$ and $\alpha_2$, respectively is $$f_1 + f_2 = \frac{\alpha_1^2}{K_1^2} + \frac{\alpha_2^2}{K_2^2} \tag{3}$$

If $$m = \frac{\alpha_2}{\alpha_1}$$

$$f_1 + f_2 = \alpha_1^2\left(\frac{1}{K_1^2} + \frac{m^2}{K_2^2}\right) \tag{4}$$

Hence, to determine the maximum frequency range for given maximum allowable attenuations for each of the two circuits, it is necessary to maximize the expression:

$$\frac{1}{K_1^2} + \frac{m^2}{K_2^2} \tag{5}$$

An expression for the high frequency attenuation of the circuit comprising one of the enclosed conductors as a return for the other when the conductors are solid or equivalent to solid (i. e., when currents of frequencies above the audible range are conducted substantially on the surface of the conductors) has been developed in the copending application of E. I. Green, H. E. Curtis, and S. P. Mead, Serial No. 674,762 filed June 7, 1933.

Letting $b$ equal the inner radius of the shield, $a$ equal the outer radius of the enclosed conductors and $c$ equal one-half the interaxial separation of the enclosed conductors as indicated in Fig. 1, the expression for the high frequency attenuation is:

$$\alpha_1 = \frac{\left[\frac{1}{2\epsilon\lambda}[1+2\lambda^2(1+2\lambda^2)(1-4\epsilon^2)]+4\epsilon^2[1+\epsilon^4-2\lambda^2(1+\lambda^2)]\right]\frac{1}{4b}\sqrt{\frac{kf_1}{\sigma}}}{\left[\log_e\left(\frac{1}{\lambda}\frac{1-\epsilon^2}{1+\epsilon^2}\right)-\lambda^2(1+\lambda^2)(1-4\epsilon^2)\right]} \tag{6}$$

Where $$\lambda = \frac{a}{2c}$$

and $$\epsilon = \frac{c}{b}$$

and where $k$ is the dielectric constant of the dielectric and $\sigma$ is the conductivity of the conductors, all in electromagnetic c. g. s. units. Hence:

$$K_1 = \frac{\left[\frac{1}{2\epsilon\lambda}[1+2\lambda^2(1+2\lambda^2)(1-4\epsilon^2)]+4\epsilon^2[1+\epsilon^4-2\lambda^2(1+\lambda^2)]\right]\frac{1}{4b}\sqrt{\frac{k}{\sigma}}}{\left[\log_e\left(\frac{1}{\lambda}\frac{1-\epsilon^2}{1+\epsilon^2}\right)-\lambda^2(1+\lambda^2)(1-4\epsilon^2)\right]} \tag{7}$$

In a similar manner it can be shown that for the circuit comprising the conducting shield as one conductor with the two enclosed conductors in parallel as the return when the enclosed conductors are solid:

$$K_2 = \frac{\frac{b}{a}\left[1+\frac{2\lambda^2}{(1+\lambda^2)^2}(1+4x^2)\left(1+4x^2\left(1+\frac{8\lambda^2}{1+\lambda^2}\right)\right)\right]\frac{1}{4b}\sqrt{\frac{k}{\sigma}}}{\log_e\frac{1-x^2}{\left(\frac{a}{b}\right)\left(\frac{2c}{b}\right)} - \left(\frac{\lambda^2(1+4x^2)}{1+\lambda^2}\left\{1+4x^2\left(1+\frac{4\lambda^2}{1+\lambda^2}\right)\right\}\right)} +$$

$$\frac{2\left[1+\frac{2x^2}{1-x^2}+\frac{8x^2\lambda^2}{1+\lambda^2}\left(1+(1+8x^2)\left(1+\frac{4\lambda^2}{1+\lambda^2}\right)\right)\right]\frac{1}{4b}\sqrt{\frac{k}{\sigma}}}{\log_e\frac{1-x^2}{\left(\frac{a}{b}\right)\left(\frac{2c}{b}\right)} - \left(\frac{\lambda^2(1+4x^2)}{1+\lambda^2}\left\{1+4x^2\left(1+\frac{4\lambda^2}{1+\lambda^2}\right)\right\}\right)} \tag{8}$$

Where $$\lambda = \frac{a}{2c}$$

and $$x = \frac{c^2}{b^2}$$

For any given radius $b$ of the conducting shield and for any given value of $k$ and $\sigma$, the diameter ratio $$\frac{b}{a}$$

and spacing ratio $$\frac{c}{b}$$

which make expression (5) a maximum can be determined by substituting various pairs of values of $$\frac{b}{a}$$

and $$\frac{c}{b}$$

in expression (5) and determining graphically or otherwise the pair which makes (5) a maximum. Careful computation shows that when $m=1$ expression (5) is a maximum when $$\frac{b}{a} = 5.9$$

and $$\frac{c}{b} = 0.33.$$

Thus the maximum total frequency range for any given inner diameter of the shield and for equal attenuations per unit length for each of the two circuits (i. e., $m=$unity,) is obtained when the diameter ratio $$\frac{b}{a} = 5.9$$

and the spacing ratio $$\frac{c}{b} = 0.33.$$

The value of $m=1$ represents an important practical case since it will as a rule be desirable to employ the same repeater points for each circuit and permit the same attenuations between repeater points. It is also of interest, however, to determine the effect of other values of $m$.

If it be assumed that the attenuation per unit length of the circuit comprising one of the enclosed conductors as a return for the other is very large compared with the attenuation per unit length of the other circuit, $m$ becomes very small. Hence, to determine the diameter and spacing ratios for maximum frequency range for a given attenuation and size of shield when only the balanced circuit is used, it is necessary to maximize $$\frac{1}{K_1^2}.$$

In the copending application of E. I. Green, H. E. Curtis, and S. P. Mead, above mentioned, the diameter and spacing ratios for this condition have been shown to be 5.4 and .46, respectively.

Similarly, the diameter and spacing ratios for maximum frequency range for a given attenuation and size of shield for the case when the attenuation per unit length of the circuit comprising one of the enclosed conductors as a return for the other is very small compared with the attenuation per unit length of the other circuit, in other words, when $m$ becomes very large, can be determined by maximizing $$\frac{1}{K_2^2}.$$

It has been determined graphically that $$\frac{1}{K_2^2}$$

is a maximum when $$\frac{b}{a} = 6.0$$

and $$\frac{c}{b} = 0.17.$$

This is the condition which holds when the unbalanced-to-ground circuit is used.

It is evident, therefore, that whatever the value of $m$, if the conductors are solid or equivalent to solid the diameter ratio should be in the range between 5.4 and 6.0 and the spacing ratio should be in the range between 0.17 and 0.46. Accordingly these are the conditions for maximum frequency range for the shielded pair system when the inner radius of the outer conductor and the maximum allowable attenuations of the two independent circuits at the highest frequencies of the bands are fixed. Small departures from the optimum proportions are possible without changing the transmission properties of the system greatly. It is interesting to note that the optimum proportioning ratios are independent of the absolute attenuations of the circuits and the size of the conductors. It is evident that the total frequency range of the system can be increased by increasing the size of the shield, keeping the ratios $$\frac{b}{a}$$

and $$\frac{c}{b}$$

fixed and also the attenuations fixed. The diameter of the shield would probably be determined by such considerations as the frequency bands to be transmitted over the two circuits and the maximum allowable attenuations at the highest frequencies.

The optimum ratios derived above are for solid conductors or their electrical equivalents. If the conductors are composed of insulated strands similar methods may be used to determine the optimum ratios.

The foregoing derivation of the proportioning of a pair with a surrounding cylindrical conductor to obtain maximum frequency range has largely been directed toward the cases where the insulating medium is largely gaseous so that the dielectric constant is substantially unity and the leakage conductance substantially zero. It can be shown, however, that the optimum proportioning will remain substantially unchanged for other types of dielectric. Thus, if the space between conductors and shield is filled with a homogeneous non-gaseous dielectric as, for example, rubber or oil, the ratios giving maximum frequency range should be the same as for a gaseous dielectric. This will also be the case when a mixture of dielectrics is employed, for example, a combination of gaseous and non-gaseous dielectrics provided that the arrangement of the dielectric is such as not to distort the path which would be assumed by the dielectric flux if the dielectric medium were entirely gaseous. Where a combination of dielectrics is employed in such a manner as to produce such distortion of the flux, the ratios for optimum proportioning may be changed to some extent but, in general, characteristics approaching the optimum will be obtained for the values which have previously been set forth.

The frequency bands that can be transmitted over the two circuits can be readily determined for any given conditions. For example, consider the case when the inner radius of the outer conductor is ½ inch and both of the two circuits are to have an attenuation of 2 db per mile. This is the case when the attenuations for the two circuits are equal. It has been shown that the maximum total range for this case is obtained by making the diameter ratio equal 5.9 and the spacing ratio .33. Substituting these ratios in expression (6) assuming $a_1$ equals 2 db per mile, $b$ equals ½ inch, and assuming copper conductors and air dielectric, it can be readily computed that the maximum frequency that can be transmitted over this circuit (i. e., the circuit comprising the enclosed conductors, one as a return for the other) is roughly 730,000 cycles. In a similar manner it can be determined from expressions (8) and (2) that the maximum frequency that can be transmitted over the circuit comprising the two enclosed conductors in parallel with sheath return for the given conditions is roughly 1,600,000 cycles. Hence the maximum total frequency range is roughly 2,330,000 cycles.

Some of the fundamental principles of the invention having now been set forth, consideration may be given to types of structures in which these principles may be incorporated. Fig. 2 represents a view of a transmission structure consisting of two solid inner conductors 1 and 2, surrounded by a cylindrical outer conductor and shield 3. The three conductors are held in position with respect to one another by insulating spacers 4 or other suitable devices. If desired, the shield may be grounded as indicated on the drawings.

The conductors 1 and 2 may be of such a type that currents of frequencies well above the audible range travel substantially on their outer surfaces. For example, these conductors may be solid wires or may be tubular. If tubular inner conductors are employed, their wall thickness will ordinarily depend upon mechanical rather than electrical considerations, since only a very thin wall is required for the conduction of the high frequency currents.

Figure 3:
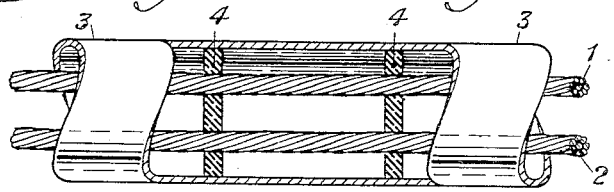

Also, the inner conductors may consist of a cylindrical assembly of conducting strips, tapes, ribbons, wires or the like, which are not insulated from one another. Such a form of construction might be particularly desirable where a flexible structure is required. One construction of this type is indicated in Fig. 3, the inner conductors 1 and 2 in this case being composed of uninsulated wires stranded together.

Figure 4:
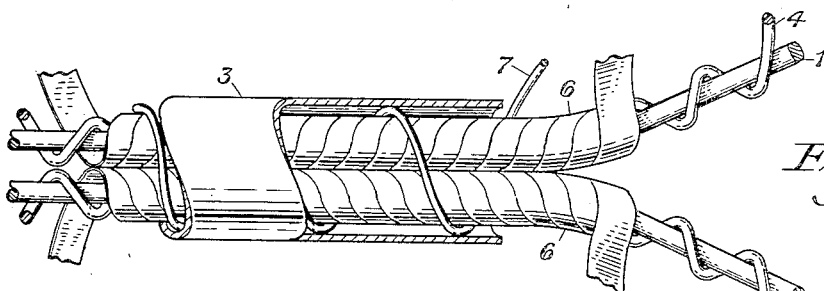
Figure 5:
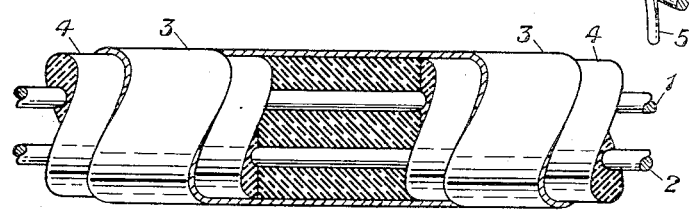

Any of various forms or shapes may be employed for the insulation between the two conductors and between conductors and sheath. One possible arrangement would be to use a continuous spirally applied string or strip of dielectric material around each conductor and another spirally applied string to separate them from the shield. An arrangement of this type is illustrated in Fig. 4 where 4 and 5 are strings of insulating material wrapped spirally around the conductors, 6 designates thin strips of insulating material covering each of the conductors and the spirally wrapped strings, and 7 is a spirally applied string separating the strips 6 from the shield 3. Generally it will be desirable that the amount of insulating material be a minimum in order that the dielectric between the two conductors may be largely gaseous. In some cases, however, it will be found advantageous to use a dielectric which is wholly or partly non-gaseous, as for example, rubber insulation. A structure with a dielectric of this kind is shown in Fig. 5. For the insulation arrangements that would ordinarily be employed in practice, the optimum configuration of the circuit will be approximately the same as for the assumed condition of gaseous dielectric.

The shield surrounding the two conductors, instead of being formed of a single tube, might consist of a cylindrical assembly of conducting strips, tapes, wires, ribbons or the like. Such forms of construction might be particularly advantageous where a flexible structure is desired. One construction of this kind is illustrated in Fig. 6, where the shield consists of a number of spiral segments formed into a tube. If desired, the shield may be surrounded by a waterproof sheath or covering 8, which may be composed of lead, rubber, or other suitable material.

In connection with the conducting shield, it may be noted that, in addition to performing an electrical function by protecting against inductive effects and serving as a conductor, it may be useful in affording mechanical protection to the circuit and thereby permitting the use, to a very considerable extent, of an air dielectric. Due to skin effect the high frequency currents will penetrate only a little way into the shield, so that the electrical requirements are satisfied by a very thin shield. Consequently, the thickness of the shield will ordinarily be determined by mechanical considerations and will usually be such that it does not enter into the problem of determining the optimum configuration of conductors and shield.

The use of the conducting shield will ordinarily make it possible where desired to allow the signals transmitted over the two circuits to drop down to a minimum level determined by the noise due to thermal agitation of electricity in the conductors. Hence, the shield facilitates the spacing of intermediate amplifiers in the circuit at wider intervals than would otherwise be possible.

In connection with the structure of Fig. 3, the enclosed conductors may be transposed at frequent intervals in order to reduce the possibility of interference into or from the circuit comprising one of the enclosed conductors as a return for the other at low frequencies where the shield is less effective. Such transposition can readily be accomplished for the circuit of Fig. 3 by twisting the two conductors helically about the axis of the shield. Fig. 7 shows a structure in which the two enclosed conductors are twisted helically about the axis of the surrounding shield.

Fig. 8 is a diagram of a multiplex carrier telephone system including the channel modulating and demodulating equipment, the filtering apparatus required for segregating the different channels and the amplifying apparatus at the terminals and at intermediate points along the line. In this figure voice-frequency currents derived from the instruments SS are applied to individual modulators as indicated by CM which convert them to carrier frequencies. The wanted sidebands are selected by channel filters CF and may after passing through the amplifiers TA be applied to the line section LC comprising a pair of wires with circular shield designed in accordance with the invention. A part of the wanted sidebands is transmitted over the enclosed pair. The remaining sidebands can be transmitted over the circuit consisting of the enclosed pairs in parallel as the return for the conducting shield. At suitable points in the line, repeaters, such as IR, may be inserted. At the receiving end the incoming carrier channels may, after being amplified in the receiving amplifiers RA, be separated by means of the channel filters SF and be brought again to voice frequencies in channel demodulators as indicated by CD. The arrangement as shown serves for transmission in one direction and a duplicate arrangement would be provided for the opposite direction of transmission.

Fig. 9 is a diagram of a television system in which the line circuit is provided by a pair of conductors having a circular conducting shield. In this diagram TT represents the television transmitting apparatus by means of which the television signals are generated. The transmitting apparatus may be such as to furnish a band of frequencies extending from approximately zero frequency to a high frequency determined by the degrees of image definition which it is desired to obtain. A low pass filter LPF separates the lower frequency components of the television signals and passes them to the enclosed pair of conductors of the line circuit LC by means of which these signals are transmitted to the television receiver TR. The higher frequency components of the television signals are separated by the high pass filter HPF and are modulated to a lower frequency range by the modulator HT, the lower frequency range corresponding roughly to that passed by the low pass filter LPF. The modulated signal is transmitted over the line circuit LC using the circuit comprising the enclosed conductors in parallel with shield return, after which it is demodulated by the demodulator DR to its original position in the frequency spectrum and then passed to the television receiver TR and connected into the desired image. If desired the television signals may be divided into two parts and the lower frequency group shifted to a higher position in the frequency spectrum using suitable apparatus at the receiving end to shift the frequency position of the television bands in a manner reverse to that employed at the transmitting end. Repeaters may be placed in the line circuit LC at intervals to compensate for the attenuation of the line. The arrangement illustrated serves for a single direction of transmission and may be duplicated for the opposite direction of transmission. It is obvious that other signals, as for example, those from voice channels, may be combined with the television signals for transmission over the line.

Fig. 10 is a diagram of a radio transmitting system in which the connections from the transmitting apparatus to the transmitting antennas is secured by means of the two circuits provided by a pair with circular shield as disclosed in the present invention. In the diagram two radio transmitters $RT_1$ and $RT_2$ are connected to the transmitting antennas $TA_1$ and $TA_2$ by the two transmission circuits provided by the shielded pair line circuits LC. $TA_1$ and $TA_2$ represent a balanced-to-ground and an unbalanced-to-ground antenna, respectively, connected to the corresponding balanced and unbalanced-to-ground circuits provided by the line circuit LC. In this manner two radio channels are transmitted over the circuit LC. It is evident that a greater number of radio channels could be transmitted by the suitable use of filters.

Various methods may be used to connect electrically to the two transmission circuits obtainable from a pair of wires surrounded by a circular shield designed in accordance with the invention. In Fig. 11, the generator $G_1$ is connected to the conductors 1 and 2 through a transformer $T_1$ thus providing a balanced-to-ground circuit. Generator $G_2$ is connected between the electrical midpoint of the conductors 1 and 2, provided by a center tap on the secondary of transformer $T_1$ and the shield 3, providing a second circuit, the latter being unbalanced-to-ground. In Fig. 12, the generator $G_1$ is connected directly to the conductors 1 and 2. A second circuit is obtained by connecting a generator $G_2$ between the shield 3 and the midpoint of a resistance R shunted across generator $G_1$.

The amount of electrical interference produced in one of the circuits by the other is determined by the electrical balance between the two circuits. In general this balance will become poorer with increasing frequency so that it may limit the frequency bands that can be used. This balance can be improved by precise manufacturing methods giving accurate geometry of construction. It will also be improved by accurately determining the electrical midpoint of the two enclosed conductors so that when they are used in parallel as a return for the shield, the current will flow equally between them. Since television can tolerate considerably more interference than telephone transmission, the two circuits derived in accordance with the invention might be especially useful for the transmission of television signals.

It will be obvious that the general principles disclosed herein may be incorporated in many other organizations different from those illustrated without departing from the spirit of the invention as defined in the following claims.

What is claimed is:

1. In an electrical transmission system, two cylindrical conductors arranged side by side and spaced apart and surrounded by a third cylindrical conductor, two independent transmission circuits derived from said conductors, one of said circuits comprising one of said enclosed conductors connected as a return for the other, the other of said circuits comprising the said enclosed conductors in parallel as a return for the surrounding conductor, said enclosed conductors being insulated from each other and from said surrounding conductor, the ratio of the diameter of the surrounding conductor to that of either inner conductor and the ratio of the spacing between the inner conductors to the diameter of the surrounding conductor being such that the expression $$\frac{1}{K_1^2}+\frac{m^2}{K_2^2}$$

will be a maximum, where $m$ is the ratio of the attenuations of the two circuits while $K_1$ and $K_2$ have the values given respectively in Equations (7) and (8) of the specification.

2. In an electrical transmission system, two cylindrical conductors arranged side by side and spaced apart and surrounded by a third cylindrical conductor, said conductors being of such a type that conduction of currents whose frequencies are substantially above the audible range takes place substantially on the surface of said conductors, two independent transmission circuits derived from said conductors, one of said conductors comprising one of said enclosed conductors connected as a return for the other, the other of said circuits comprising the said enclosed conductors in parallel as a return for the surrounding conductor, said enclosed conductors being insulated from each other and from said surrounding conductor, the ratio of the diameter of the surrounding conductor to that of either inner conductor and the ratio of the spacing between the inner conductors to the diameter of the surrounding conductor being such that the expression $$\frac{1}{K_1^2}+\frac{m^2}{K_2^2}$$

will be a maximum, where $m$ is the ratio of the attenuations of the two circuits while $K_1$ and $K_2$ have the values given respectively in Equations (7) and (8) of the specification.

3. In an electrical transmission system, two cylindrical conductors arranged side by side and spaced apart and surrounded by a third cylindrical conductor, said conductors being of such a type that conduction of currents whose frequencies are substantially above the audible range takes place substantially on the surface of said conductors, two independent transmission circuits derived from said conductors, one of said circuits comprising one of said enclosed conductors connected as a return for the other, the other of said circuits comprising the said enclosed conductors in parallel as a return for the surrounding conductor, said enclosed conductors being insulated by a substantially gaseous dielectric from each other and from said surrounding conductor, the ratio of the diameter of the surrounding conductor to that of either inner conductor and the ratio of the spacing between the inner conductors to the diameter of the surrounding conductor being such that the expression $$\frac{1}{K_1^2}+\frac{m^2}{K_2^2}$$

will be a maximum, where $m$ is the ratio of the attenuations of the two circuits while $K_1$ and $K_2$ have the values given respectively in Equations (7) and (8) of the specification.

4. In an electrical transmission system, two cylindrical conductors arranged side by side and spaced apart and surrounded by a third cylindrical conductor, said enclosed conductors consisting of a plurality of insulated conducting strands, two independent transmission circuits derived from said conductors, one of said circuits comprising one of said enclosed conductors connected as a return for the other, the other of said circuits comprising the said enclosed conductors in parallel as a return for the surrounding conductor, said enclosed conductors being insulated from each other and from said surrounding conductor, the ratio of the diameter of the surrounding conductor to that of either inner conductor and the ratio of the spacing between the inner conductors to the diameter of the surrounding conductor being such that the expression $$\frac{1}{K_1^2}+\frac{m^2}{K_2^2}$$

will be a maximum, where $m$ is the ratio of the attenuations of the two circuits while $K_1$ and $K_2$ have the values given respectively in Equations (7) and (8) of the specification.

5. In an electrical transmission system, two cylindrical conductors arranged side by side and spaced apart and surrounded by a third cylindrical conductor, two independent transmission circuits derived from said conductors, one of said circuits comprising one of said enclosed conductors connected as a return for the other, the other of said circuits comprising the said enclosed conductors in parallel as a return for the surrounding conductor, said enclosed conductors being insulated from each other and from said surrounding conductor, the ratio of the interaxial separation of said enclosed conductors to the inner diameter of said surrounding conductor being approximately in the range between .17 and .46, and the ratio of the inner diameter of said surrounding conductor to the diameter of each of said enclosed conductors being approximately in the range between 5.4 and 6.0.

6. In an electrical transmission system, two cylindrical conductors arranged side by side and spaced apart and surrounded by a third cylindrical conductor, two independent transmission circuits derived from said conductors, one of said circuits comprising one of said enclosed conductors connected as a return for the other, the other of said circuits comprising the said enclosed conductors in parallel as a return for the surrounding conductor, said enclosed conductors being insulated by a substantially gaseous dielectric from each other and from said surrounding conductor, the ratio of the interaxial separation of said enclosed conductors to the inner diameter of said surrounding conductor being approximately in the range between .17 and .46, and the ratio of the inner diameter of said surrounding conductor to the diameter of each of said enclosed conductors being approximately in the range between 5.4 and 6.0.

7. In an electrical transmission system, two cylindrical conductors arranged side by side and spaced apart and surrounded by a third cylindrical conductor, said conductors being of such a type that conduction of currents whose frequencies are substantially above the audible range takes place substantially on the surface of said conductors, two independent transmission circuits derived from said conductors, one of said circuits comprising one of said enclosed conductors connected as a return for the other, the other of said circuits comprising the same enclosed conductors in parallel as a return for the surrounding conductor, said enclosed conductors being insulated from each other and from said surrounding conductor, the ratio of the interaxial separation of said enclosed conductors to the inner diameter of said surrounding conductor being approximately in the range between .17 and 46, and the ratio of the inner diameter of said surrounding conductor to the diameter of each of said enclosed conductors being approximately in the range between 5.4 and 6.0.

8. In an electrical transmission system, two cylindrical conductors arranged side by side and spaced apart and surrounded by a third cylindrical conductor, said conductors being of such a type that conduction of currents whose frequencies are substantially above the audible range takes place substantially on the surface of said conductors, two independent transmission circuits derived from said conductors, one of said circuits comprising one of said enclosed conductors connected as a return for the other, the other of said circuits comprising the said enclosed conductors in parallel as a return for the surrounding conductor, said enclosed conductors being insulated by a substantially gaseous dielectric from each other and from said surrounding conductor, the ratio of the interaxial separation of said enclosed conductors to the inner diameter of said surrounding conductor being approximately in the range between .17 and .46, and the ration of the inner diameter of said surrounding conductor to the diameter of each of said enclosed conductors being approximately in the range between 5.4 and 6.0.

9. In an electrical transmission system, two cylindrical conductors arranged side by side and spaced apart and surrounded by a third cylindrical conductor, two independent transmission circuits derived from said conductors, one of said circuits comprising one of said enclosed conductors connected as a return for the other, the other of said circuits comprising the said enclosed conductors in parallel as a return for the surrounding conductor, said enclosed conductors being insulated from each other and from said surrounding conductor, the ratio of the interaxial separation of said enclosed conductors to the inner diameter of said surrounding conductor being approximately 0.33 and the ratio of the inner diameter of said surrounding conductor to the diameter of each of said enclosed conductors being approximately 5.9.

10. In an electrical transmission system, two cylindrical conductors arranged side by side and spaced apart and surrounded by a third cylindrical conductor, two independent transmission circuits derived from said conductors, one of said circuits comprising one of said enclosed conductors connected as a return for the other, the other of said circuits comprising the said enclosed conductors in parallel as a return for the surrounding conductor, said enclosed conductors being insulated from each other and from said surrounding conductor by a substantially gaseous dielectric, the ratio of the interaxial separation of said enclosed conductors to the inner diameter of said surrounding conductor being approximately 0.33 and the ratio of the inner diameter of said surrounding conductor to the diameter of each of said enclosed conductors being approximately 5.9.

11. In an electrical transmission system, two cylindrical conductors arranged side by side and spaced apart and surrounded by a third cylindrical conductor, said conductors being of such a type that conduction of currents whose frequencies are substantially above the audible range takes place substantially on the surface of said conductors, two independent transmission circuits derived from said conductors, one of said circuits comprising one of said enclosed conductors connected as a return for the other, the other of said circuits comprising the said enclosed conductors in parallel as a return for the surrounding conductor, said enclosed conductors being insulated from each other and from said surrounding conductor, the ratio of the interaxial separation of said enclosed conductors to the inner diameter of said surrounding conductor being approximately 0.33 and the ratio of the inner diameter of said surrounding conductor to the diameter of each of said enclosed conductors being approximately 5.9.

12. In an electrical transmission system, two cylindrical conductors arranged side by side and spaced apart and surrounded by a third cylindrical conductor, said conductors being of such a type that conduction of currents whose frequencies are substantially above the audible range takes place substantially on the surface of said conductors, two independent transmission circuits derived from said conductors, one of said circuits comprising one of said enclosed conductors connected as a return for the other, the other of said circuits comprising the said enclosed conductors in parallel as a return for the surrounding conductor, said enclosed conductors being insulated from each other and from said surrounding conductor by a substantially gaseous dielectric, the ratio of the interaxial separation of said enclosed conductors to the inner diameter of said surrounding conductor being approximately 0.33 and the ratio of the inner diameter of said surrounding conductor to the diameter of each of said enclosed conductors being approximately 5.9.

13. In an electrical transmission system, two cylindrical conductors arranged side by side and spaced apart and surrounded by a third cylindrical conductor, two independent transmission circuits derived from said conductors, one of said circuits comprising one of said enclosed conductors connected as a return for the other, the other of said circuits comprising the said enclosed conductors in parallel as a return for the surrounding conductors, said enclosed conductors being insulated from each other and from said surrounding conductor, both of said circuits being designed to transmit without excessive attenuation a band of frequencies extending up to a maximum frequency many times the limit of audibility, terminal apparatus associated with each of said circuits for supplying thereto and receiving and utilizing therefrom a band of frequencies extending from approximately zero to a frequency many times the upper limit of the audible range, said circuits each transmitting without excessive attenuation the band of frequencies so applied thereto.

14. In an electrical transmission system, two cylindrical conductors arranged side by side and spaced apart and surrounded by a third cylindrical conductor, two independent transmission circuits derived from said conductors, one of said circuits comprising one of said enclosed conductors connected as a return for the other, the other of said circuits comprising the said enclosed conductors in parallel as a return for the surrounding conductor, said enclosed conductors being insulated from each other and from said surrounding conductor by a substantially gaseous dielectric, both of said circuits being designed to transmit without excessive attenuation a band of frequencies extending up to a maximum frequency many times the limit of audibility, terminal apparatus associated with each of said circuits for supplying thereto and receiving and utilizing therefrom a band of frequencies extending from approximately zero to a frequency many times the upper limit of the audible range, said circuits each transmitting without excessive attenuation the band of frequencies so applied thereto.

15. In an electrical transmission system, two cylindrical conductors arranged side by side and spaced apart and surrounded by a third cylindrical conductor, said conductors being of such a type that conduction of currents whose frequencies are substantially above the audible range takes place substantially on the surface of said conductors, a transmission circuit derived from said conductors, said circuit comprising the enclosed conductors in parallel as a return for the surrounding conductor, said enclosed conductors being insulated from each other and from said surrounding conductor, the ratio of the inner diameter of said surrounding conductor to the diameter of each of said enclosed conductors being approximately 6.0 and the ratio of the interaxial separation of said enclosed conductors to the inner diameter of said surrounding conductor being approximately 0.17.

HAROLD E. CURTIS.
SALLIE P. MEAD.